(12) United States Patent
Thomas

(10) Patent No.: US 6,810,625 B2
(45) Date of Patent: Nov. 2, 2004

(54) VEHICLE DOOR AUXILIARY WINDOW ASSEMBLY

(76) Inventor: Gerrell T. Thomas, 20211 Grandville, Detroit, MI (US) 48219

( * ) Notice: Subject to any disclaimer, the term of this patent is extended or adjusted under 35 U.S.C. 154(b) by 0 days.

(21) Appl. No.: 10/394,530

(22) Filed: Mar. 21, 2003

(65) Prior Publication Data

US 2003/0204994 A1 Nov. 6, 2003

Related U.S. Application Data

(60) Provisional application No. 60/366,217, filed on Mar. 21, 2002.

(51) Int. Cl.[7] ................................................. B60J 5/04
(52) U.S. Cl. ................................. 49/502; 49/63; 49/171
(58) Field of Search ...................... 49/168, 169, 171, 49/142, 502, 61, 63; 362/501

(56) References Cited

U.S. PATENT DOCUMENTS

| | | | | |
|---|---|---|---|---|
| 1,921,290 A | * | 8/1933 | Gragg et al. ................. 362/540 |
| 2,904,671 A | * | 9/1959 | Johnston ..................... 362/501 |
| 4,331,359 A | * | 5/1982 | Sheldon .................... 296/146.2 |
| 4,467,402 A | * | 8/1984 | Bauer et al. ................. 362/501 |
| 4,585,514 A | * | 4/1986 | Scallan ......................... 216/54 |
| 4,652,337 A | * | 3/1987 | Picone et al. .................. 216/45 |
| 4,773,697 A | * | 9/1988 | Svensson ..................... 296/152 |
| 4,930,255 A | * | 6/1990 | Sea ............................... 49/63 |
| 5,165,188 A | * | 11/1992 | Tsiros ............................ 49/63 |
| 6,158,869 A | * | 12/2000 | Barnes, Jr. ................... 362/86 |
| 6,446,375 B1 | * | 9/2002 | Davis ........................... 40/597 |
| 6,616,312 B2 | * | 9/2003 | Carter ........................ 362/488 |
| 6,619,824 B1 | * | 9/2003 | Hou ............................ 362/501 |
| 2003/0025354 A1 | * | 2/2003 | Akintan et al. ........ 296/146.16 |

* cited by examiner

Primary Examiner—Gregory J. Strimbu
(74) Attorney, Agent, or Firm—MacMillan, Sobanski & Todd, LLC

(57) ABSTRACT

An auxiliary window assembly is adapted to be installed adjacent an aperture formed in a lower portion of a vehicle door. The vehicle door can be of the type that includes a window opening formed in an upper portion thereof. The auxiliary window assembly preferably includes a windowpane member and a shield member, each of which is operable to be controlled by a window regulator mechanism or the like to move from an upper closed position visible in the aperture to a lower open position. The auxiliary window assembly also includes lighting mounted in the door adjacent the aperture.

9 Claims, 3 Drawing Sheets

VEHICLE DOOR AUXILIARY WINDOW ASSEMBLY

CROSS-REFERENCE TO RELATED APPLICATION

This application claims the benefit of U.S. provisional patent application Ser. No. 60/366,217 filed Mar. 21, 2002.

BACKGROUND OF THE INVENTION

The present invention relates generally to a window for a vehicle door and, in particular, to a window provided in a lower portion of a vehicle door.

Vehicle interior accessories and comfort features for the occupants of a vehicle, such as power windows, sunroofs, and the like are well known. Vehicle purchasers prefer the 'open-air' feel of vehicles equipped with removable roofs, sunroofs, and moon roofs and prefer the convenience of power windows and the like. The demand for more features and versatility in vehicle interior accessories continues to grow.

It remains desirable, therefore, to provide interior accessories having more features and that provide more versatility and comfort for the occupants of the vehicle.

SUMMARY OF THE INVENTION

The present invention concerns an auxiliary window assembly adapted to be installed in an aperture formed in a lower portion of a vehicle door. The auxiliary window assembly preferably includes a windowpane member and a shield member, each of which is operable to be controlled by a window regulator mechanism or the like to move from an upper closed position to a lower open position.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
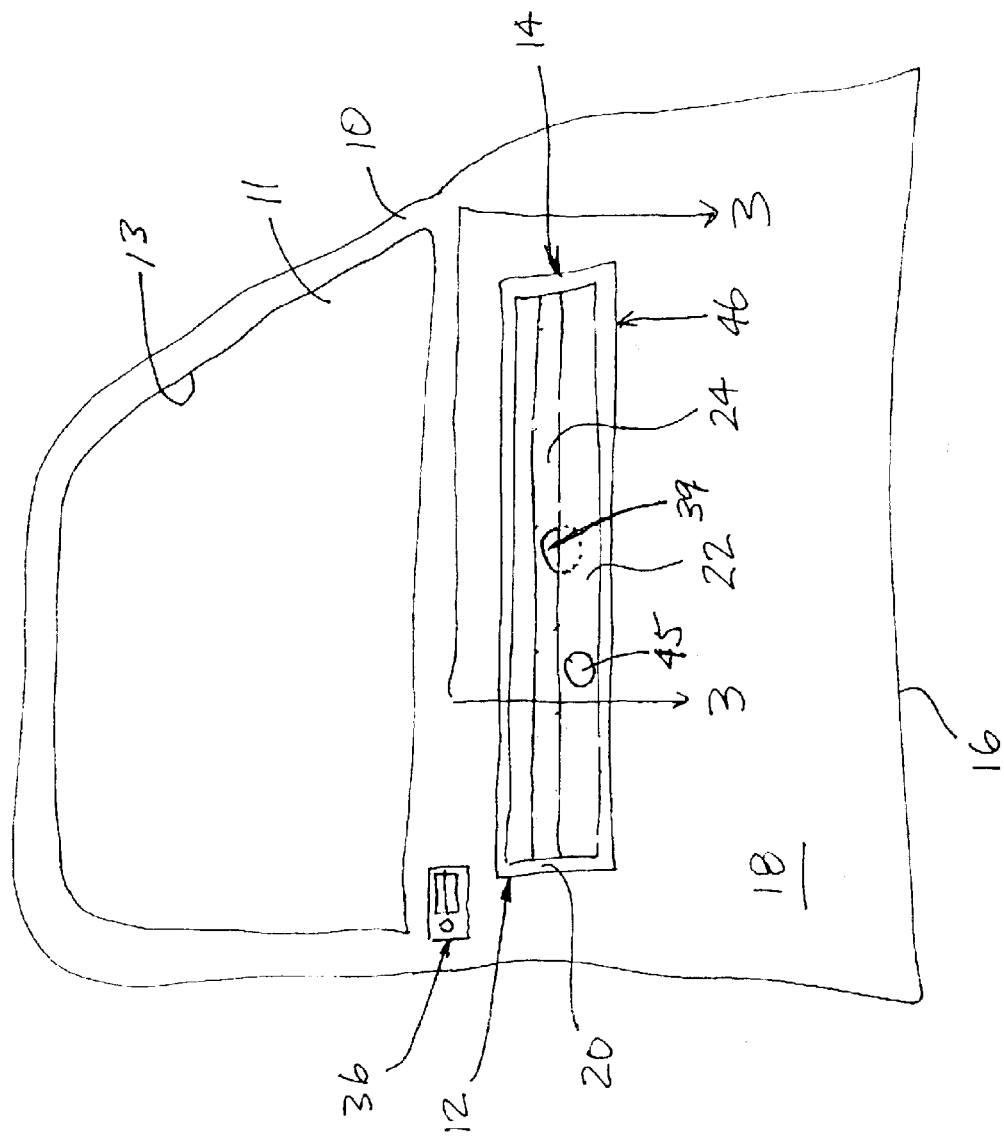
FIG. 1 is an exterior side elevation view of a vehicle door having an auxiliary window assembly in accordance with the present invention.
Figure 2:
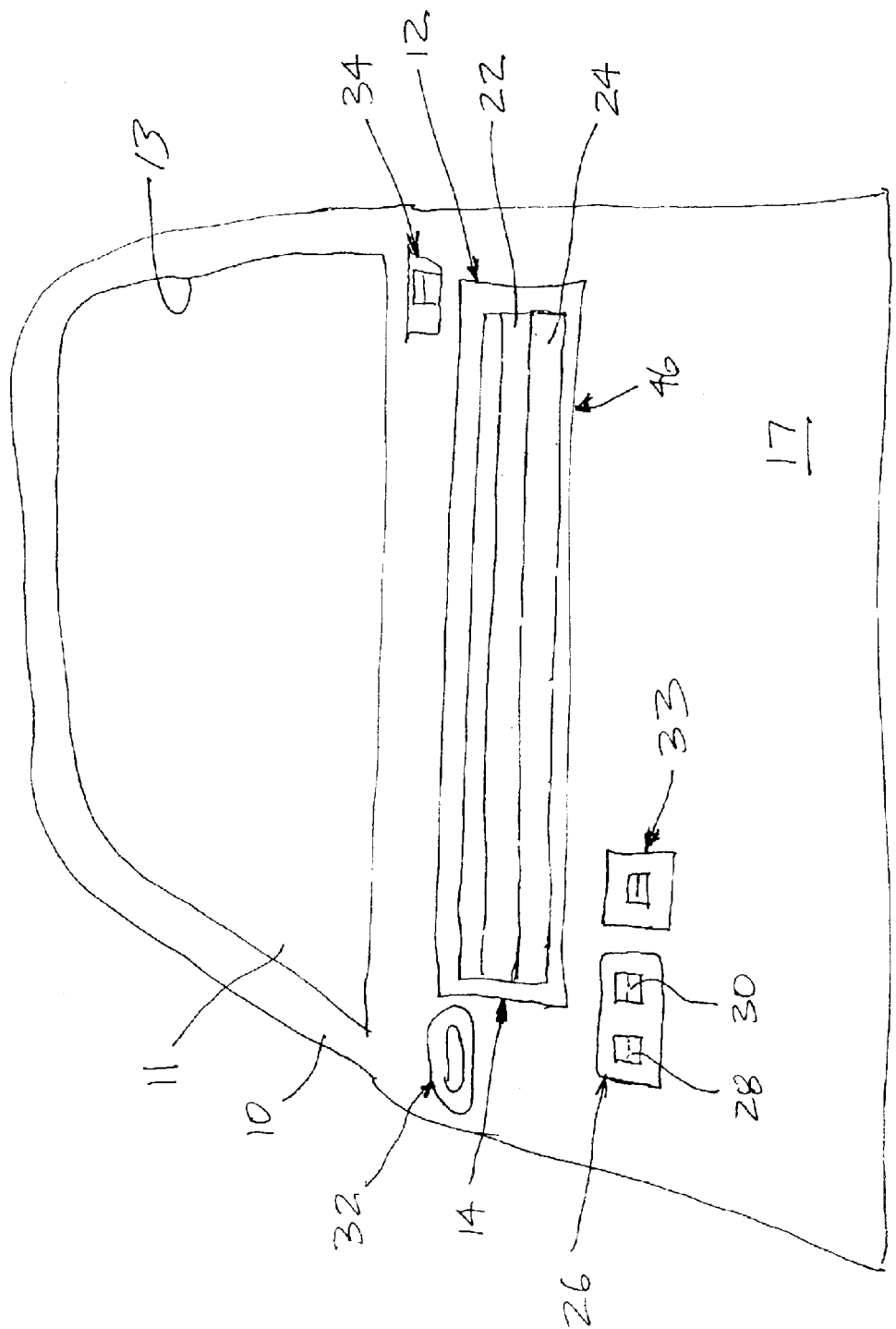
FIG. 2 is an interior side elevation view of the vehicle door and window assembly shown in FIG. 1.
Figure 3:
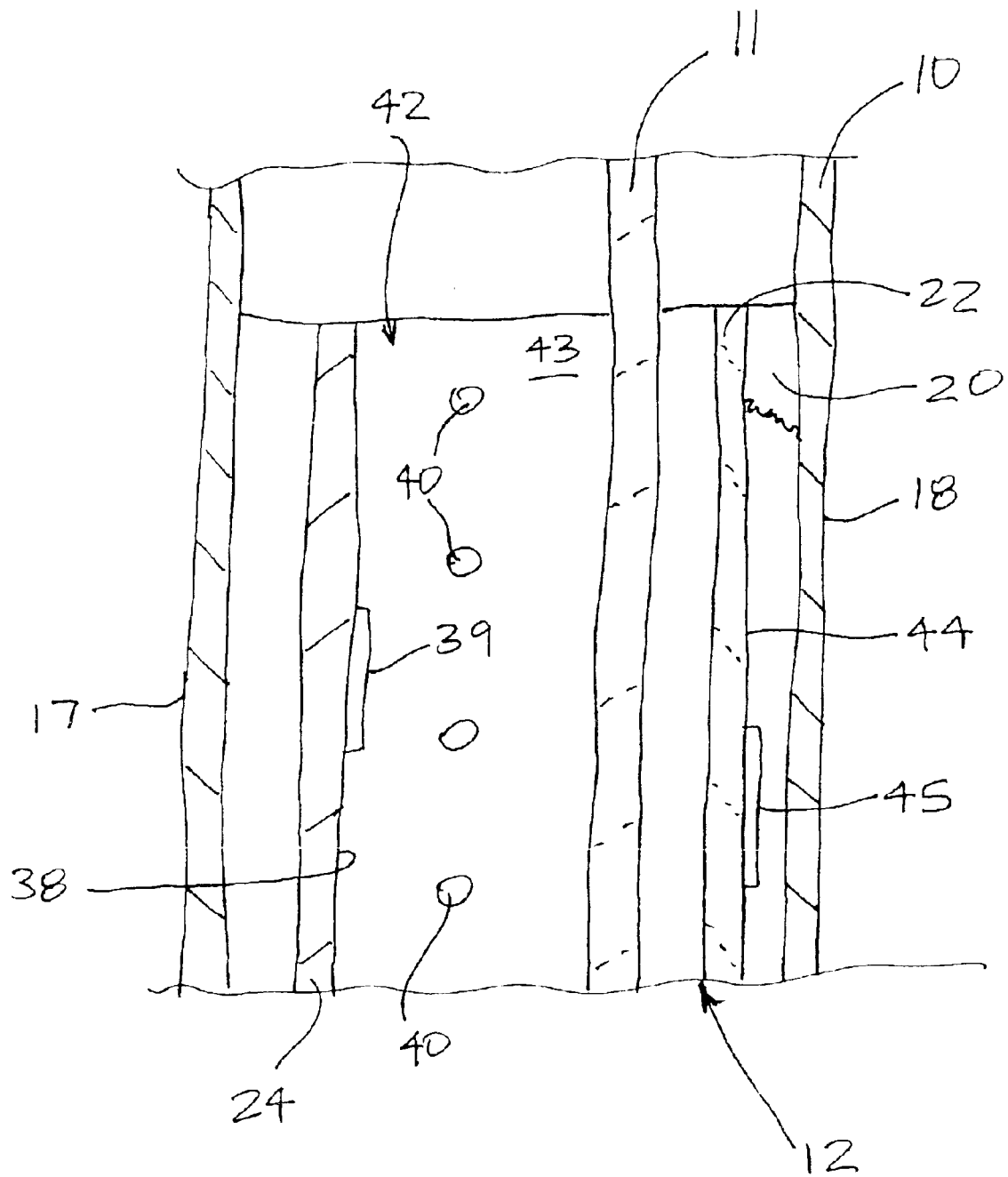
FIG. 3 is a cross-sectional view taken along the line 3—3 in FIG. 1.

Referring now to FIGS. 1, 2, and 3, a vehicle side door 10 is shown having a typical window 11 positioned in a window opening 13 formed in an upper portion of the door 10. The window 11 is operable to be moved in a substantially vertical plane between an upper closed position (as shown) and a lower open position (not shown) by a window regulator (not shown) mounted inside a lower portion of the door 10. The window regulator can be any type of window regulator, such as the mechanism shown in the U.S. Pat. No. 3,888,047, incorporated herein by reference, or the like. The window regulator can be manually or power actuated.

The door 10 includes an auxiliary window assembly 12 positioned in an aperture 14 formed in the door body between the window opening 13 and a lower edge 16 of the door. The aperture 14 extends through an inner surface 17 and an outer surface 18 of the door 10. Preferably the aperture 14 is positioned such that the auxiliary window assembly 12 is positioned at or above the level of a seat bottom (not shown) adjacent the inner surface 17 of the door. Alternatively, the auxiliary window assembly 12 is positioned at any point between the lower edge 16 of the door 10 and a lower edge of the window opening 13. An edge of the aperture 14 is sealed at the outer surface 18 of the door 10 by a seal member 20, which is preferably constructed of rubber or the like to prevent water or foreign objects from entering the aperture 14 when the auxiliary window assembly 12 is closed. The seal member 20 is shown in a fragmentary view in FIG. 3. The outer surface 18 of the door 10 has a door handle 36 mounted thereon.

The auxiliary window assembly 12 includes an auxiliary window glass or windowpane member 22 and a shield or shade member 24 slidably disposed in the aperture 14. The windowpane member 22 and the shield member 24 are each operable to be moved from an upper closed position to a lower opened position. In the upper closed positions, the windowpane member 22 and the shield member 24 are each operable close the aperture 14. For clarity, the shield member 24 is shown in a first partially lowered position lower than a second partially lowered position of the windowpane member 22 in FIG. 1 and, in FIG. 2, the positions of the windowpane member 22 and the shield member 24 are reversed. The windowpane member 22 is formed of a transparent material and the shield member 24 is formed of an opaque material.

Preferably, the movements of each of the windowpane member 22 and the shield member 24 are controlled by a power controller 26, best seen in FIG. 2. The power controller 26 is positioned in an aperture (not shown) in the inner surface 17 of the door 10 and includes a first switch 28 for controlling the movement of the windowpane member 22 and a second switch 30 for controlling the movement of the shield member 24. Each of the switches 28 and 30 of the power controller 26 is electrically connected to a respective power-type window regulator (not shown) including a motor drive assembly such as the assembly shown in the U.S. Pat. No. 3,635,100 incorporated herein by reference, or a similar type regulator that is operable to move the windowpane member 22 and shield member 24 as outlined above. Alternatively, the windowpane member 22 and the shield member 24 are connected to a manual-type regulator (not shown). The inner surface 17 of the door 10 also includes a door handle 32, a controller 33 for controlling the movement of the window 11, and a lock lever 34. A weatherstrip member (not shown) or similar sealing means preferably extends about an interior circumference of the auxiliary window assembly 12 to assist the seal member 20 in preventing water or foreign objects from entering the aperture 14. The sealing means provides a sealing surface for the windowpane member 22 and the shield member 24 in their respective upper closed positions.

As best seen in FIG. 3, the shield member 24 has an outwardly facing surface 38 to which a display 39 is affixed. The display 39 can be words and/or images (e.g., a manufacturer's logo) for viewing through the aperture 14 when the shield member 24 is in the upper closed position. The display 39 can be a separate component such as a decal or paint applied to the surface 38, or can be formed integrally with the shield member 24 as a depression or a projection or some combination of both. In a similar manner, the windowpane member 22 has an outwardly facing surface 44 to which a display 45 is affixed. The display 45 can be words and/or images (e.g., a manufacturer's logo) for viewing through the aperture 14 when the member 22 is in the upper closed position. The display 45 can be a separate component such as a decal or paint applied to the surface 44, or can be formed integrally with the windowpane member 24 as a depression, a projection, etching, or some combination thereof.

Referring now to FIG. 3, a plurality of lights 40, which are connected to an electrical power source (not shown), are disposed in a space 42 formed between the windowpane member 22 and the shield member 24. Preferably, the lights 40 are attached to a surface 43 that extends between the windowpane member 22 and the shield member 24 just below a lower edge portion 46, best seen in FIGS. 1 and 2, of the auxiliary window assembly 12. The lights 40 are preferably protected by a lens member (not shown) or the like for preventing the lights 40 from breaking when either the windowpane member 22 or the shield member 24 is in the lower open position. The lights 40 can be positioned for decorative uses or to signal when the vehicle brakes have been applied and can be advantageously seen from inside and outside the vehicle.

The windowpane member 22 preferably moves in a substantially vertical plane between the plane in which window 11 moves and an outer wall of the door 10 represented by the outer surface 18. The shield member 24 preferably moves in a substantially vertical plane between the plane in which window 11 moves and an inner wall of the door 10 represented by the inner surface 17. Because of their spaced apart and parallel orientation, the windowpane member 22, the shield member 24, and the window 11 are each operable to move between the upper closed position and the lower opened position concurrently without interfering each other or with any other hardware, such as the window regulators, the controller 26, the door handle 32, the controller 33, the lock lever 34, the door handle 36, located within the door 10. Alternatively, the operations of the windowpane member 22, the window 11 and the shield member 24 are interlocked in some manner. In such an arrangement, the controllers 26 and 33 are interlocked by a control system (not shown) to prevent operation of the respective window regulators while the prohibited arrangement exists.

The auxiliary window assembly 12 can be advantageously formed as an OEM part/material. Alternatively, the auxiliary window assembly 12 can be formed as an aftermarket product for those doors, such as the door 10, having sufficient space in which to dispose the auxiliary window assembly 12.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An assembly comprising:
    a vehicle door having an upper portion with an aperture and a lower portion with an aperture formed in an outer surface of said lower portion;
    a window glass movable between a closed position wherein said window glass closes said aperture of said upper portion and an open position wherein said window glass is substantially disposed within said lower portion to open said aperture of said upper portion;
    an auxiliary window glass inside said lower portion, said auxiliary window glass being movable between a glass open position away from said aperture of said lower portion and a glass closed position adjacent said aperture of said lower portion; and
    a shade mounted inside said lower portion, said shade being movable between a shade open position away from said aperture of said lower portion and a shade closed position adjacent said aperture of said lower portion.

2. The assembly according to claim 1 including lighting mounted inside said lower portion and positioned to be visible from a position facing said outer surface of said lower portion of said door.

3. The assembly according to claim 1 wherein said shade includes a display on a surface thereof facing said aperture of said lower portion.

4. The assembly according to claim 1 wherein said auxiliary window glass includes a display on a surface thereof facing said aperture of said lower portion.

5. The assembly according to claim 1 including a controller operable to control movement of said shade between the shade open position and the shade closed position.

6. The assembly according to claim 1 including a controller operable to control the movement of said auxiliary window glass between the glass open position and the glass closed position.

7. The assembly according to claim 1 including a seal member mounted about an edge of said aperture of said lower portion and cooperating with said auxiliary window glass in closed position for sealing said auxiliary window glass with respect to said aperture of said lower portion of said door.

8. The assembly according to claim 1 wherein said auxiliary window glass is positioned between said aperture of said lower portion and said shade when said auxiliary window glass is in the glass closed position and said shade is in the shade closed position.

9. An assembly comprising:
    a vehicle door having an upper portion with an aperture and a lower portion with an aperture formed in an outer surface of said lower portion;
    a window glass movable between a closed position wherein said window glass closes said aperture of said upper portion and an open position wherein said window glass is substantially disposed within said lower portion to open said aperture of said upper portion;
    an auxiliary window glass inside said lower portion, said auxiliary window glass being vertically moveable between a glass open position away from said aperture of said lower portion and a glass closed position adjacent said aperture of said lower portion; and
    a seal member mounted about an edge of said aperture of said lower portion and cooperating with said auxiliary window glass in the glass closed position for sealing said auxiliary windows glass with respect to said aperture of said lower portion of said door.

* * * * *